United States Patent [19]

Sullivan

[11] 3,781,791

[45] Dec. 25, 1973

[54] METHOD AND APPARATUS FOR DECODING BCH CODES

[75] Inventor: Daniel David Sullivan, Howell Township, Monmouth County, N.J.

[73] Assignee: Bell Telephone Laboratories, Incorporated, Murray Hill, Berkeley Heights, N.J.

[22] Filed: Dec. 13, 1971

[21] Appl. No.: 206,997

[52] U.S. Cl. .................................... 340/146.1 AL
[51] Int. Cl..... H04l 1/10, H03k 13/34, G08c 25/04
[58] Field of Search .......................... 340/146.1 AL

[56] References Cited

OTHER PUBLICATIONS

Berlekamp, E. R. Algebraic Coding Theory, N.Y., McGraw Hill, 1968, p. 184 and 198–199.

Berlekamp, E. R. Algebraic Coding Theory, N.Y., McGraw Hill, 1968, p. 193–194. TS653.D4

Richards, R. K. Arithmetic Operations in Digital Computers. Princeton, N.J., D. Van Nostrand, 1955, p. 290. TK7888.3.R5.

*Primary Examiner*—Malcolm A. Morrison
*Assistant Examiner*—R. Stephen Dildine, Jr.
*Attorney*—W. L. Keefauver et al.

[57] ABSTRACT

Apparatus is disclosed for performing Berlekamp's algorithm to effect the decoding of binary BCH codes. In particular, in accordance with the present invention, Berlekamp's algorithm is restated such that two variables are advantageously combined and a simplified circuit disclosed for performing the iterations specified by the restated algorithm.

5 Claims, 5 Drawing Figures

| $i$ | $\alpha^i$ |
|---|---|
| 0 | 00001 |
| 1 | 00010 |
| 2 | 00100 |
| 3 | 01000 |
| 4 | 10000 |
| 5 | 00101 |
| 6 | 01010 |
| 7 | 10100 |
| 8 | 01101 |
| 9 | 11010 |
| 10 | 10001 |
| 11 | 00111 |
| 12 | 01110 |
| 13 | 11100 |
| 14 | 11101 |
| 15 | 11111 |
| 16 | 11011 |
| 17 | 10011 |
| 18 | 00011 |
| 19 | 00110 |
| 20 | 01100 |
| 21 | 11000 |
| 22 | 10101 |
| 23 | 01111 |
| 24 | 11110 |
| 25 | 11001 |
| 26 | 10111 |
| 27 | 01011 |
| 28 | 10110 |
| 29 | 01001 |
| 30 | 10010 |
| 31 | 00001 |

FIG. 4

| OPERATION IN POSITION 1 | | | |
|---|---|---|---|
| PRESENT STATE (BINARY) | NEXT STATE (BINARY) | PRESENT STATE (DECIMAL) | NEXT STATE (DECIMAL) |
| 0 0 0 | 1 0 0 | 0 | 1 |
| 1 0 0 | 0 1 0 | 1 | 2 |
| 0 1 0 | 1 1 0 | 2 | 3 |
| 1 1 0 | 0 0 1 | 3 | 4 |
| 0 0 1 | 1 0 1 | 4 | 5=-3 MOD 8 |
| 1 0 1 | 0 1 1 | 5=-3 MOD 8 | 6=-2 MOD 8 |
| 0 1 1 | 1 1 1 | 6=-2 MOD 8 | 7=-1 MOD 8 |
| 1 1 1 | 0 0 0 | 7=-1 MOD 8 | 0 |

| OPERATION IN POSITION 2 | | | |
|---|---|---|---|
| PRESENT STATE (BINARY) | NEXT STATE (BINARY) | PRESENT STATE (DECIMAL) | NEXT STATE (DECIMAL) |
| 0 0 0 | 0 0 0 | 0 | 0 |
| 1 0 0 | 1 1 1 | 1 | 7=-1 MOD 8 |
| → 0 1 0 | 0 1 1 | 2 | 6=-2 MOD 8 |
| 1 1 0 | 1 0 1 | 3 | 5=-3 MOD 8 |
| 0 0 1 | 0 0 1 | 4 | 4 |
| 1 0 1 | 1 1 0 | 5=-3 MOD 8 | 3 |
| 0 1 1 | 0 1 0 | 6=-2 MOD 8 | 2 |
| 1 1 1 | 1 0 0 | 7=-1 MOD 8 | 1 |

METHOD AND APPARATUS FOR DECODING BCH CODES

BACKGROUND OF THE INVENTION

1. Field of the Invention

The present invention relates to error-control systems and more specifically to error-control systems for correcting errors in accordance with Bose-Chaudhuri-Hocquenghem (BCH) coding techniques.

2. Description of the Prior Art

The need for controlling and limiting errors in the transmission and processing of digital data has long been recognized. Normally, such digital data is represented by different combinations of data words just as combinations of letters of the English language alphabet represent words.

Numerous systems have been developed for improving the accuracy of transmission and processing of data words. One such system involves encoding data words into code words (of certain predetermined codes) which contain not only the original data words but also additional or redundant information (for example, parity digits). Such code words can then be processed in certain prescribed ways to determine whether or not errors have occurred in the data words and, often, to specify the positions of any such errors.

Codes have been devised for correcting random errors (errors occurring randomly throughout the transmitted data), burst errors (errors occurring in "bunches"), or both random and burst errors. One of the best-known class of codes for correcting random errors is the BCH codes described, for example, in Peterson, W. W., Error-Correcting Codes, The M.I.T. Press and John Wiley, 1961, pp. 162–182 and "Codes Correcteurs D'erreurs", Chiffres, Vol. 2, pp. 147–156, September, 1959.

BCH decoders have in general, however, proved very difficult to implement because of the complexity of the circuitry required to perform the decoding. Nonetheless, BCH decoders are well recognized to be among the best of the random-error-correcting decoders. There has therefore been a long-felt need for less complex, simplified, economical BCH decoders.

BCH decoding is typically considered to comprise three distinct phases. One of these phases, the second, involves the implementation of what is known in the art as Berlekamp's algorithm. It is this aspect of BCH decoding — the circuit implementation of Berlekamp's algorithm—to which the present invention is directed.

The solution of Berlekamp's algorithm typically requires the repeated calculation of a number of variables during a number of iterations. Further, at each iteration the algorithm follows one of two possible "branches" depending on the result of a comparison between two integer variables which were generated during the preceding iteration. A prior art system for performing the iterations and comparisons is disclosed in an article by J. L. Massey entitled "Cyclic Decoding Procedures for Bose-Chaudhuri-Hocquenghem Codes", appearing in the IEEE Transactions on Information Theory, Vol. IT-10, October 1964, pp. 357 et seq.

The cited Massey arrangement, however, requires the brute-force calculation of each of the variables specified in Berlekamp's algorithm, the storage and comparison of two of those variables and an appropriate calculation based on the detected comparison. As a result, the Massey arrangement requires an inordinate amount of complex circuitry.

A patent to H. O. Burton, U.S. Pat. No. 3,648,236 issued Mar. 7, 1972 describes an improvement to the Massey system whereby complex circuitry for effecting certain inversions required in implementing Berlekamp's algorithm is eliminated. The circuitry of the present invention supplants the more complicated Massey arrangement to a large extent and may be used without modification with the inversionless circuit of the above-mentioned Burton arrangement.

In view of the above-described prior art arrangements, it is an object of this invention to provide more efficient apparatus for decoding BCH codes.

It is moreover an object of the present invention to provide apparatus for simplifying BCH decoders. More specifically, it is an object of the present invention to provide a simple, economical circuit for implementing Berlekamp's algorithm.

It is a related object of the present invention to provide circuitry for signaling the detection of error patterns not correctable by the decoding circuitry provided.

SUMMARY OF THE INVENTION

These and other objects of the present invention are realized in a specific illustrative system embodiment in which information sequences which have been encoded in a t-error correcting BCH code are processed to first obtain the power sum symmetric functions thereof, represented by the symbols $S_1, S_2, \ldots, S_{2t}$.

In accordance with the present invention, simplified circuitry is provided for performing iterations specified by a modified version of Berlekamp's algorithm to obtain the so-called roots of the error-locator polynomial from the power sum symmetric functions. This circuitry includes a branching circuit which comprises a number of shift register stages, switches and basic logic circuit blocks. In particular, the switches in the branching circuit are "ganged", as it were, and assume one of two positions depending on the comparison of two variables in Berlekamp's algorithm, as modified. More particularly, when the switches are in one of two positions the overall branching circuit operates as a binary counter and when the switches assume the second position, the circuit performs a more complex logic function to be described in detail below.

It is therefore a feature of the present invention that a shift register and a small amount of logic circuitry replace a number of multistage shift registers and comparatively more logic circuitry.

BRIEF DESCRIPTION OF THE DRAWINGS

A complete understanding of the present invention and of the above and other objects, features and advantages thereof may be gained from a consideration of the following detailed description of an illustrative embodiment thereof presented hereinbelow in connection with the accompanying drawing, in which:

FIG. 4 illustrates the progressive states assumed by the branching control circuit of FIG. 3.

DETAILED DESCRIPTION

Figures 1A, 1B:
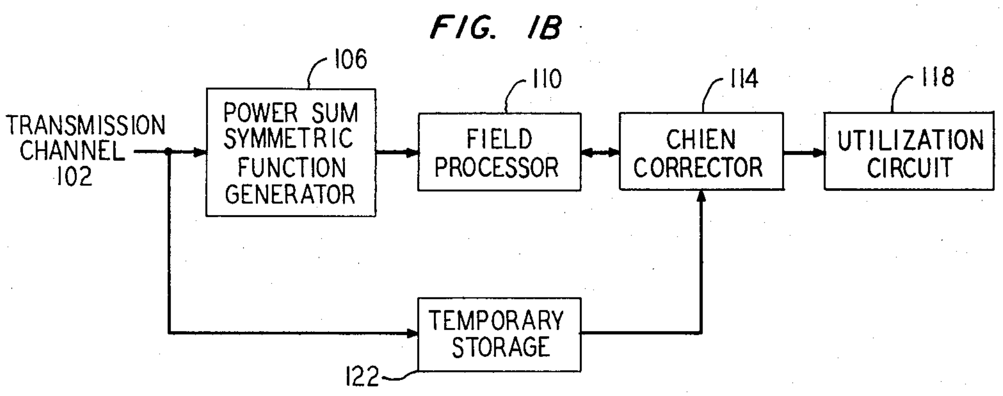
FIG. 1A is a table of values of elements of an illustrative BCH code.
FIG. 1B shows a generalized decoder for decoding BCH codes.

Before discussing the apparatus of the present invention, it is considered that a brief general review of BCH codes will be helpful. For a more complete analysis, resort to one of the texts cited above, Algebraic Coding Theory, by E. R. Berlekamp, McGraw-Hill Book Co., 1968, or any other standard text in the error-correcting arts is recommended. As defined in these references, a BCH code of length $n=2^m-1$ can, with at most $mt$ check bits, correct any set of $t$ independent errors (or alternatively detect any set of $2t$ errors) within a block of $n$ bits. The integers $m$ and $t$ are arbitrary positive integers.

Further, a $t$-error-correcting binary BCH code may be described as the set of all polynomials $[a(x)]$ over the Galois field $GF(2^m)$ of degree $n-1$ or less, such that $$a(\alpha^i) = 0, \; i = 1, 3, 5, \ldots, 2t-1$$

where $\alpha$ is a primitive element of the finite field $GF(2^m)$, $a(x) = a_0 + a_1x + a_2x^2 + \ldots + a_{n-1}x^{n-1}$, and $a_j = 0,1$ $(j = 0, 1, 2, \ldots, n-1)$. In other words, $a(x)$ is a code word of the BCH code if and only if $a(\alpha^i) = 0$. These polynomials or code words consist of all the multiples of the polynomial $G(x)$, known as the generator polynomial of the code. $G(x)$ is the polynomial of least degree which satisfies the equations $G(a^i) = 0$, $i = 1, 3, 5, \ldots, 2t-1$.

In general, then, a code word which has been transmitted over a communication channel may be represented, $$r(x) = a(x) + e(x)$$

where $e(x)$ represents the error polynomial [i.e., the errors which occurred in the transmitted code word $a(x)$]. By substituting the field elements $\alpha^i$ in $r(x)$, the following is obtained:

$r(\alpha^i) = a(\alpha^i) + e(\alpha^i) = e(\alpha^i) = S_i$; $i = 1, 3, \ldots, 2t-1$. As stated, the functions $S_i$ are known as the power sum symmetric functions. These functions can be utilized to determine the location of errors in the transmitted data sequences. (See, for example, the afore-cited Peterson text and Chien, R. T. ., "Cyclic Decoding Procedures for Bose-Chaudhuri-Hocquenghem Codes," I.E.E.E. Transactions on Information Theory, October, 1964, pp. 357–363.) One of the most easily implemented methods for determining the location of errors from the power sum symmetric functions is that formulated by E. R. Berlekamp and described in the above-cited text by Berlekamp at pp. 194 and 195.

In short, Berlekamp's formulation, or iterative algorith, for BCH codes consists of solving for an error-locator polynomial, $\delta(z)$, given a power sum symmetric function $S(z) = S_1z + S_2z^2 + S_3z^3 + \ldots$, where, again, $S_i = e(\alpha^i)$ and $e(x)$ is the error polynomial corresponding to the received word. In a given application, $S_i$ is known only for a finite span, say $1 \leqslant i \leqslant 2t$, where $t$ is the number of errors correctable by the code when it is decoded in accordance with a BCH decoding algorithm.

Using this known span, the error-locator polynomial, $\delta(z)$, for binary codes is calculated in accordance with Berlekamp's algorithm as follows:

Initially, define $\delta^{(0)} = 1$, $D(0) = 0$, and $\tau^{(0)} = 1$. Proceed recursively, with index $k$ beginning at 0, as follows: If $S_{2k+1}$ is unknown, stop; otherwise, define $\Delta_1^{(2k)}$ as the coefficient of $z^{2k+1}$ in the product $[1 + S(z)]\delta^{(2k)}$. Let $$\delta^{(2k+2)} = \delta^{(2k)} + \Delta_1^{(2k)} z\tau^{(2k)}$$

$$\tau^{(2k+2)} = \begin{cases} z^2\tau^{(2k)} \text{ if } \Delta_1^{(2k)}=0 \text{ or if } D(2k)>k \\ \dfrac{z\sigma^{(2k)}}{\Delta_1^{(2k)}} \text{ if } \Delta_1^{(2k)}\neq 0 \text{ and } D(2k)\leq k \end{cases}$$

and $$D(2k+2) = \begin{cases} D(2k) \text{ if } \Delta_1^{(2k)}=0 \text{ or if } D(2k)>k \\ 2k+1-D(2k) \text{ if } \Delta_1^{(2k)}\neq 0 \text{ and } D(2k)\leq k. \end{cases}$$

In the binary case, there are $t$ iterations in the algorithm and if, in fact, there were $t$ or fewer errors in the received word, then $\delta(z) = \delta^{(2t)}$ and the locations of the errors are represented by the reciprocal roots of $\delta(z)$.

Notice that, at each iteration, the algorithm follows one of two branches, depending on the comparison between $D(2k)$ and $k$. If the algorithm is programmed on a computer, performing this comparison is somewhat simplified. One can store the most recent value of $D(2k)$, using the above-specified equations to recompute $D(2k)$ for each $k$ and compare it with a stored value of $k$. Alternatively, one can use the fact that, for the binary case, $D(2k)$ is the same as the degree of $\delta^{(2k)}$ and inspect the coefficients of the polynomial $\delta^{(2k)}$ to find the highest degree nonzero term. In implementing such an algorithm with logic circuits, however, either of these alternatives is difficult to apply and requires complex circuitry.

In accordance with the preferred embodiment of the present invention, Berlekamp's algorithm is restated in terms of somewhat different variables. Thus, let the function $F(k)$ be defined as follows:

$$F(k) \triangleq k - D(2k).$$

A partial restatement of the algorithm proceeds thus:

Initially define $\delta^{(0)} = 1$, $\tau^{(o)} = 1$, and $F(0) = 0$. Proceed recursively, with index $k$ initially at 0, such that, if $S_{2k+1}$ is unknown, stop; otherwise, define $\Delta_1^{(2k)}$ as the coefficient of $z^{2k+1}$ in the product $[1 + S(z)]\delta^{(2k)}$. Then, let $$\delta^{(2k+2)} = \delta^{(2k)} + \Delta_1^{(2k)} z\tau^{(2k)}$$

and $$\tau^{(2k+2)} = \begin{cases} z^2\tau^{(2k)} \text{ if } \Delta_1^{(2k)}=0 \text{ or if } F(k)<0 \\ \dfrac{z\sigma^{(2k)}}{\Delta_1^{(2k)}} \text{ if } \Delta_1^{(2k)}\neq 0 \text{ and } F(k)\geq 0. \end{cases}$$

To complete the algorithm, it simply remains to define the recursive equation for $F(k)$. From the above-stated definition of $F(k)$ it is apparent that $$F(k+1) = k + 1 - D(2k+2).$$

Hence, applying the above-specified recursive relationship for $D(2k+2)$, $F(k+1)$ can be rewritten $$F(k+1) = \begin{cases} F(k)+1 \text{ if } \Delta_1^{(2k)}=0 \text{ or if } F(k)<0 \\ -F(k) \text{ if } \Delta_1^{(2k)}\neq 0 \text{ and } F(k)\geq 0. \end{cases}$$

It is noted at this point that if the error pattern contains more than $t$ errors then, in general, $\delta^{(2t)} \neq \delta(z)$ and the error locations cannot be obtained from the reciprocal roots of $\delta^{(2t)}$. In this event, $\delta^{(2t)}$ is said to be invalid. After completing Berlekamp's algorithm, as modified above, two tests are performed to determine the validity of $\delta^{(2t)}$. If the error pattern is detectable but not correctable (i.e., the errors are known to exist, but their locations cannot be determined), $\delta^{(2t)}$ will fail one of these two tests. The first of these tests consists of simply comparing the degree of $\delta^{(2t)}$ (deg $\delta^{(2t)}$), with $t$. If deg $\delta^{(2t)} > t$, then $\delta^{(2t)}$ is assumed to be invalid. For binary BCH codes, deg $\delta^{(2t)} = D(2t)$; hence, this test is equivalent to assuming that $\delta^{(2t)}$ is invalid if $t - D(2t) = F(t) < 0$.

The second test involves the requirement that the number of roots of $\delta^{(2t)}$ found in $GF(2^m)$ must be equal to deg $\delta^{(2t)} = D(2t)$. However, since $F(t) + D(2t) = t$, it follows that for $\delta^{(2t)}$ to be valid, we must have $F(t) +$ [the number of roots in $GF(2^m)$] $= t$.

By way of illustration, consider an example wherein it is assumed that information sequences are encoded in a (31,16) triple-error-correcting BCH code. The values of the elements $\alpha^j$, where $j = 0,1,...,30$ of the field over which the code is defined are given in FIG. 1A. Assume, for the moment, that errors have occurred in a received code word in positions 3, 7 and 13, where the positions of a code word are numbered from 0 to 31. The corresponding elements identifying these error positions are, from FIG. 1A, then, $\alpha^3 = 01000$, $\alpha^7 = 10100$, and $\alpha^{13} = 11100$. The positions of these errors are determined in accordance with the present invention as will now be described.

First, the power sum symmetric functions $S_1$, $S_3$ and $S_5$ of the received sequence are generated. The values of these functions in the present example are $$S_1 = r(\alpha) = a(\alpha) + e(\alpha) = e(\alpha)$$
$$= \alpha^3 + \alpha^7 + \alpha^{13} = 00000 = 0$$
$$S_3 = r(\alpha^3) = a(\alpha^3) + e(\alpha^3) = e(\alpha^3)$$
$$= (\alpha^3)^3 + (\alpha^7)^3 + (\alpha^{13})^3$$
$$= (\alpha^9) + (\alpha^{21}) + (\alpha^8)$$
$$= 01111 = \alpha^{23}$$
$$S_5 = r(\alpha^5) = a(\alpha^5) + e(\alpha^5) = e(\alpha^5)$$
$$= (\alpha^3)^5 + (\alpha^7)^5 + (\alpha^{13})^5$$
$$= \alpha^{15} + \alpha^4 + \alpha^3$$
$$= 00111 = \alpha^{11}.$$

Utilizing these power sum symmetric functions and the definitions, $\alpha^{(0)} = 1$, $\tau^{(0)} = 1$, and $F(0) = 0$, the function $\Delta_1^{(0)}$ is next generated. Recall that $\Delta_1^{(2k)}$ is the coefficient of $z^{2k+1}$ in the product $[1+S(z)]\delta^{(2k)}$. For $k$=0, then, the expression $[1+S(z)]\delta^{(2k)}$ reduces simply to $[1+S(z)]\ \ 1 = 1+S_1z+S_2z^2+... = 1+0\ \ z+0\ \ z^2+....$ (It should be noted that $S_2$ in the above equation was obtained from the equation $S_2 = S_1^2 = (0)^2 = 0$.) Thus, the coefficient of $z^{2k+1} = z^{2\cdot 0+1} = z$ in the above expression is simply 0; so, $\Delta_1^{(0)} = 0$.

In addition, for $k = 0$, $\delta^{(2)} = \delta^{(0)} + \Delta_1^{(0)} z\tau^{(0)}$. Thus, $\delta^{(2)} = 1+0\ \ z\ \ 1 = 1$. Also, since $\Delta_1^{(0)} = 0$, then $\tau^{(2)} = z^2\tau^{(0)} = z^2\ \ 1 = z^2$. Finally, again since $\Delta_1^{(0)} = 0$, $F(1) = F(0) + 1 = 0+1 = 1$.

For $k$=1, the following parameters are generated. The term $\Delta_1^{(2)}$ is the coefficient of $z^3$ in the product $[1+S(z)]\delta^{(2)} = (1+0\ \ z+0\ \ z^2+\alpha^{23}z^3+...)\ \ 1$.

Thus, $\Delta_1^{(2)} = \alpha^{23}$. The polynomial $\delta^{(4)}$ is therefore, $\delta^{(4)} = \delta^{(2)} + \alpha_1^{(2)} z\tau^{(2)} = 1+\alpha^{23}\ \ z\ \ z^2 = 1+\alpha^{23}z^3$. Further, since $\Delta_1^{(2)} \neq 0$ and $F(1) = 1 > 0$, then $\tau^{(4)} = z\delta^{(2)}/\Delta_1^{(2)} = z\ \ 1/\alpha^{23} = \alpha^{23}z = \alpha^8 z$. Finally, since $\Delta_1^{(2)} \neq 0$ and $F(1) = 1 > 0$, $F(2) = -F(1) = -1$.

For $k$=2, the following parameters are generated. The term $\Delta_1^{(2)}$ is the coefficient of $z^5$ in the product $[1+S(z)]\delta^{(2)} = (1+0\ \ z+0\ \ z^2+\alpha^{23}z^3+0\ \ z^4+\alpha^{11}z^5) \cdot (1+\alpha^{23}z^3) = (1+0\ \ z+0\ \ z^2+0\ \ z^3+0\ \ z^4+\alpha^{11}z^5+...)$. ($S_4$ in the above equation is obtained from the equation $S_4 = S_2^2 = 0$.) Thus, the coefficient of $z^5$ in the above expression is $\alpha^{11}$. Hence, $\Delta_1^{(4)} = \alpha^{11}$ $\delta^{(6)}$ is therefore, $\tau^{(6)} = \delta^{(4)} + \Delta_1^{(4)} z\tau^{(4)} = 1+\alpha^{23}z^3+\ \alpha^{11}\ \ z\ \ \alpha^8\ \ z = 1+\alpha^{19}z^2+\alpha^{23}z^3$. Since $F(1) = -1 < 0$, $\tau^{(6)} = z^2\tau^{(4)} = \alpha^8 z^3$. Finally, since $F(1) = -1 < 0$, $F(2) = F(1) + 1 = -1 + 1 = 0$.

Now, for $k$=3, it is apparent that $S_{2k}+1 = S_7$ is unknown. The algorithm is therefore complete and the error locations are determined by the reciprocal roots of the polynomial $\delta^{(6)} = 1+\alpha^{19}z^2+\alpha^{23}z^3$. The roots of this polynomial are $\alpha^{28}$, $\alpha^{24}$, and $\alpha^{18}$. Hence, the reciprocal roots are $\alpha^{-28} = \alpha^3$, $\alpha^{-24} = \alpha^7$, and $\alpha^{-18} = \alpha^{13}$, indicating that the errors are in locations 3, 7 and 13, which agrees with the initial assumption.

It may also be noted that, since $F(3) = 0$ and since $F(3) +$ [the number of roots found in $GF(2^m)$] $= 0+3 = 3 = t$, both conditions for the validity of $\delta^{(6)}$ are satisfied.

Now consider FIG. 1B, where there is shown a generalized illutrative embodiment of a receiving station for receiving and decoding BCH codes in accordance with the present invention. The station includes a power sum symmetric function generator 106 and a temporary storage unit 122 for receiving BCH code words transmitted over a transmission channel 102. The power sum symmetric function generator 106 generates the power sum symmetric functions for each received code word and applies these functions to field processor 110. The field processor 110, in turn, performs the iterations specified by Berkekamp's decoding algorithm, as modified, and applies the resulting polynomial to Chien corrector 114. The Chien corrector 114 processes the polynomial and determines the reciprocal roots thereof. These reciprocal roots identify the error positions in the code word in question. The temporary storage unit 122 then applies the code word in question to the Chien corrector 114 which corrects the errors and applies the resultant corrected code word to a utilization circuit 118.

Figure 2:
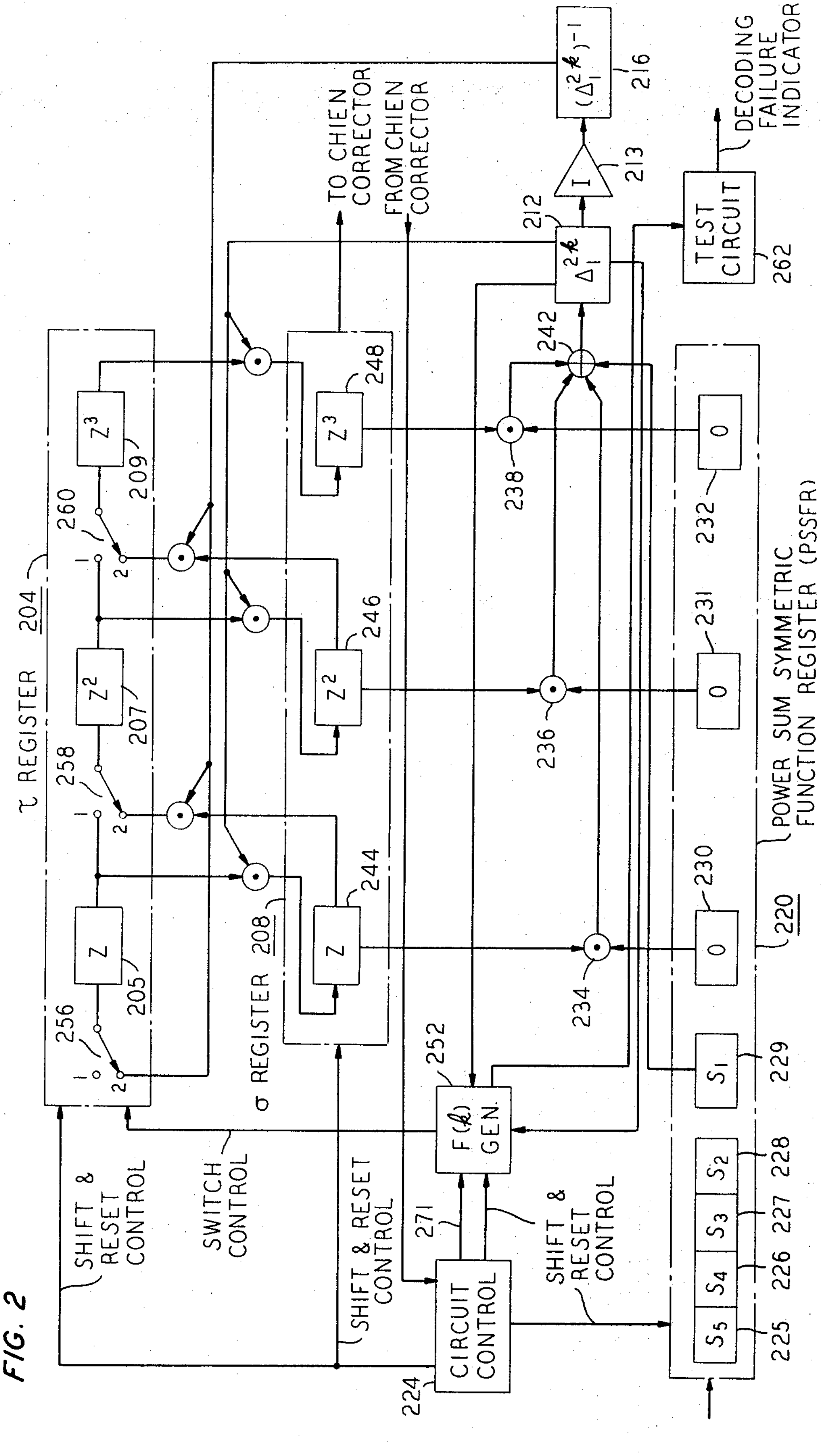
FIG. 2 shows a field processor in accordance with the preferred embodiment of the present invention.

The power sum symmetric function generator 106 can illustratively comprise a circuit of the type shown in FIG. 2 of H. O. Burton, U.S. Pat. No. 3,389,375, issued June 18, 1968. The Chien corrector 114 can illustratively comprise multiplication and addition circuits as described in Chapter 7 of the afore-cited Peterson text arranged as shown in FIG. 2 of the afore-cited article by R. T. Chien.

FIG. 2 of the present invention, shows, in preferred embodiment, a field processor for calculating the polynomial $\delta^{(2t)}$, for $t$=3. The apparatus includes a multistage $\tau$ register 204 for registering the various values of $\tau^{(2k+2)}$ generated during the course of the calculation of $\delta^{(6)}$. More specifically, register stages 205, 207 and 209 of the $\tau$ register store the coefficients of $z^1$, $z^2$ and $z^3$, respectively, in the term $\tau^{(2k+2)}$. This is indicated by the symbols in each of these registers in FIG. 2. The apparatus of FIG. 2 also includes a $\delta$ register 208 for registering successive values of $\delta^{(2k+2)}$ (the particular registers for registering the coefficients of the various terms of $\delta^{(2k+2)}$ are also identified in FIG. 2), a $\Delta_1^{(2k)}$ register 212 for registering successive values of $\Delta_1^{(2k)}$, a $[\Delta_1^{(2k)}]^{-1}$ register 216 for registering successive values of $[\Delta_1^{(2k)}]^{-1}$, and a power sum symmetric function register 220 for registering the power sum symmetric functions generated for each received word by the power sum symmetric function generator 106 of FIG. 1B.

The circuit of FIG. 2 will now be described assuming that the calculation of a set of power sum symmetric functions has been completed and that the circuit control 224 has initialized each of the registers 204, 208, 212, 216 and 220. Specifically, the leftmost stage of the $\tau$ register 204 is initially set to 1 and the two rightmost stages are initially set to 0. This corresponds to an initial setting $z\tau^{(0)} = z$. Further, all stages of the $\delta$ register 208 are set to 0 as are the stages of the $F(k)$ register 252 and the $\Delta_1^{(2k)}$ and the $[\Delta_1^{(2k)}]^{-1}$registers, 212 and 216, respectively.

The first step of the operation of the circuit of FIG. 2 is the application to the register 220 by the power sum symmetric function generator 106 of the power sum symmetric functions generated for the most recently received code word, specifically, the power sum symmetric function $S_1$ in register 229, the function $S_2$ in register 228, the function $S_3$ in register 227, the function $S_4$ in register 226, and the function $S_5$ in register 225. One iteration of the FIG. 2 apparatus will now be described.

The value of $\Delta_1^{(2k)} = \Delta_1^{(0)}$ is first calculated and applied to the $\Delta_1^{(2k)}$ register 212. (Recall that $\Delta_1^{(0)}$ is the coefficient of $z$ in the product $[1+S(z)]\delta^{(0)}$, i.e., $\Delta_1^{(0)} = S_1$.) This is accomplished by applying the contents of registers 244 and 230 to a multiplier 234, the contents of registers 246 and 231 to a multiplier 236 and the contents of registers 248 and 232 to a multplier 238. These multipliers generate the products of the contents applied respectively to them and apply these products as well as the contents of register 229 to a Galois field adder 242 where the terms are added together and then applied to the $\Delta_1^{(2k)}$ register 212. During the first iteration, for example, each of the registers 244, 246 and 248 includes a 0. The products of multipliers 234, 236 and 238 are therefore, also zero, and the contents of register 229, $S_1$, is applied, unaltered, via adder 242 to $\Delta_1^{(2k)}$ register 212. In general, however, the contents of the stages of register 220 are combined with the contents of $\delta$ register 208 as mentioned above. The contents of register 212 if nonzero, are then inverted by means of inverter 213 and applied to $[\Delta_1^{(2k)}]^{-1}$register 216.

The next step is to determine whether or not the contents of the $\Delta_1^{(2k)}$ register 212 are equal to zero or not and to determine if the present state of the $F(k)$ register 252 is negative. A switch control circuit 315 of standard design depicted in FIG. 3 and located in $F(k)$ generator 252, determines if the contents of register 212 are zero or not in accordance with well-known techniques. In addition there is depicted in FIG. 3, a state detector 313 also of standard design and also in $F(k)$ generator 252 which determines the negative or non-negative status of the $F(k)$ register itself.

Figure 3:
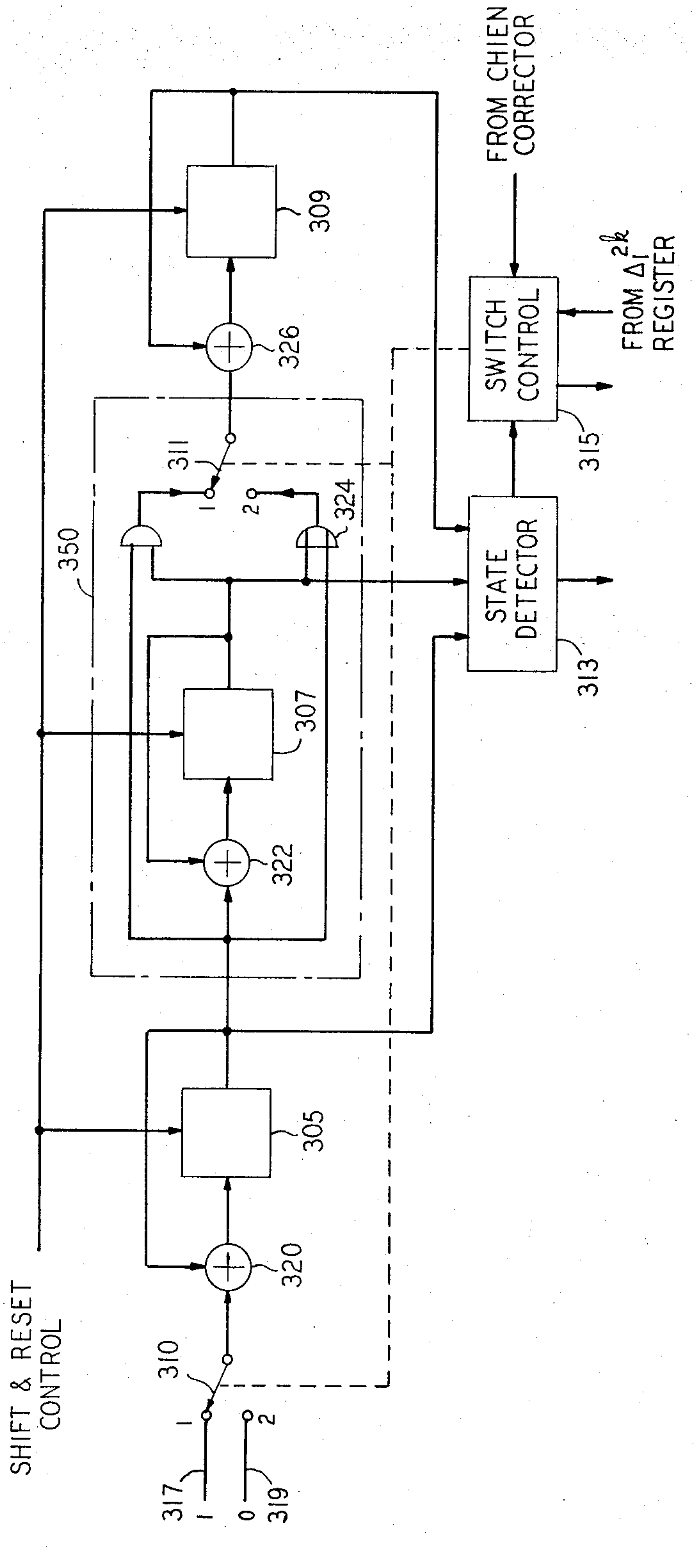
FIG. 3 shows in typical embodiment a branching control circuit for use in the processor of FIG. 2.

FIG. 3 shows an $F(k)$ generator in accordance with the preferred embodiment of the present invention. In addition, FIG. 4 illustrates the progression of states of the circuit of FIG. 3 in binary, decimal and mod 8 notation. It is readily verified that, with the switches in the positions indicated, the circuit of FIG. 3 proceeds from "present" to "next" state as indicated in FIG. 4. More importantly, the mod 8 notation defines (as noted in FIG. 4) which of the states are interpreted as negative and, hence, when $F(k)$ is itself negative.

For example, with switches 310 and 311 in position 1, the circuit of FIG. 3 behaves as a binary counter; that is, the present state, $F(k)$ is succeeded by the next state, $F(k) + 1$. Alternatively, with switches 310 and 311 in position 2, the circuit operates such that the present state, $F(k)$ is succeeded by the next state, $-F(k)$. Again, FIG. 4 shows the contents of the register stages 305, 307 and 309 of FIG. 3 for any two successive states. For example, present state 000 simply means that register stages 305, 307 and 309 each include 0's. With switches 310 and 311 in position 1, a 1 on lead 317 is applied to register 305 during a shift of the register producing the next state 100 as indicated. The logic 1 and 0 on leads 317 and 319 are, in the preferred embodiment generated by control circuit 224 in FIG. 2 and applied to $F(k)$ generator 252 via lead 271.

As an alternate example, assume that the circuit of FIG. 3 is in the state 010 with the switches in position 2 (the state signified by an arrow in FIG. 4). More specifically, a 0 occupies stage 305, a 1 occupies stage 307 and a 0 occupies stage 309. During a shift, a 0 is applied via lead 319 and switch 310 to exclusive-OR circuit 320 which adds to it the 0 previously stored in stage 305 to produce a resulting 0 also applied to register stage 305. The originally stored 0 is further applied to exclusive-OR circuit 322 where it is combined in modulo-2 fashion with the contents of register stage 307, a logic 1. The resulting 1 is again applied to register stage 307. In addition, the "present state" 0 from register stage 305 and the "present state" 1 from register 307 are combined at OR gate 324 to produce a 1, applied via switch 311 to exclusive-OR circuit 326. Exclusive-OR circuit 326 adds the incoming 1 with the contents of register stage 309, 0, to produce the "next state" contents of register stage 309, 1. Thus, it is verified that the present state, 010, of the circuit of FIG. 3 yields the next state, 011, with the switches in position 2. Also, it is evident that present state 2 (in decimal) yields the next state $-2$ mod 8.

It is emphasized, at this point, that the circuit shown in FIG. 3 is adapted for the detection and correction of three errors as noted, although it can be used for the correction of up to four errors. By adding an additional stage, identical to the one indicated by the numeral 350 in FIG. 3 and between block 305 and exclusive-OR circuit 326 in FIG. 3, an eight-error correcting circuit is produced. Add one more stage and the circuit can correct 16 errors, and so on.

In accordance with the algorithm, then, if it is determined by switch control 315 that $\Delta_1^{(2k)} = 0$ or $F(k) < 0$, switches 310 and 311 in $F(k)$ generator 252 and switches 256, 258 and 260 in $\tau$ register 204 are set in position 1 by switch control 315. The $\tau$ register 204, the $\delta$ register 208 and the $F(k)$ register 252 are then shifted one position to the right under the control of circuit control 224.

In the $\delta$ register 208, the shift effects the calculation, $$\delta^{(2k+2)} = \delta^{(2k)} + \Delta_1^{(2k)} z\tau^{(2k)}$$

where $\delta^{(2k)}$ and $\delta^{(2k+2)}$ are, respectively, the present and next state of the δ register 208. Similarly, the shift effects the calculation, $$\tau^{(2k+2)} = z^2\tau^{(2k)}$$

where $z^2\tau^{(2k)}$ and $\tau^{(2k+2)}$ are, again, the present and next states, respectively.

In addition, the present state of $F(k)$ register 252 is succeeded by the state $F(k+1) = F(k) + 1$ when the switches are in position 1.

Alternatively, if $\Delta_1^{(2k)} \neq 0$ and $F(k) \geq 0$, switches 310 and 311 in $F(k)$ register 252 are set in position 2 by switch control 315 as are switches 256, 258 and 260 in τ register 204. The τ register 208, τ register 204 and $F(k)$ register 252 are then shifted once to the right under control of circuit control 224. The shift thus made again effects calculation of $$\delta^{(2k+2)} = \delta^{(2k)} + \Delta_1^{(2k)} z\tau^{(2k)} .$$

Similarly, the next state of τ register 204 will be $$\tau^{(2k+2)} = z\delta^{(2k)}(\Delta_1^{(2k)})^{-1} \text{and}$$

the next state of $F(k)$ register 252 will be $F(k+1) = -F(k)$ with the switches in position 2.

Switches 256, 258 and 260 then return to position 1, again under control of circuit control 224 and τ register 204 is shifted once more to reflect the state $z\tau^{(2k+2)}$. Once this is done, the power sum symmetric function register 220 is shifted twice to the right unless the just-completed iteration was the last (third, for the example chosen).

When the last iteration has been completed, the state of the $F(k)$ register 252 is determined by test circuit 262. If the state of $F(k)$ is negative, test circuit 262 generates a signal indicating that a decoding failure has been encountered; that is, there are errors but the decoder cannot specify the location of those errors. In the example chosen, this would occur if there were more than three errors in the received word.

Assuming that $F(k)$ is nonnegative, the contents of δ register 208 (that is, the coefficients of the error locator polynomial) are shifted out to Chien corrector 114. The error locations are then determined by noting which (three or fewer) elements of the location field are roots of the error locator polynomial. A complete discussion of the operation of Chien correctors for use in accordance with the preferred embodiment of the present invention is included in the above-cited IEEE Transactions article by R. T. Chien. Suffice it to say, here, that the Chien corrector 114 effects a search algorithm which systematically substitutes each field element into the error locator polynomial and each time a root is found, a shifting pulse is sent to $F(k)$ generator 252 via the lead labelled "From Chien Corrector."

At the beginning of the Chien search the $F(k)$ register is in the state which it had attained at the completion of Berlekamp's algorithm. During the Chien search, switches 310 and 311 are set to position 1 thus causing $F(k)$ generator 252 to operate as a binary counter. Thus, each time a shifting pulse is received from the Chien corrector, the value of the state of the $F(k)$ register increases by 1. At the completion of the Chien algorithm the state of $F(k)$ generator 252 should correspond to the maximum number of errors which Berlekamp's algorithm is capable of correcting (three, in the example chosen), regardless of the actual number of errors corrected. Otherwise, a decoding failure is signaled.

What is claimed is:

1. In a system for decoding code words of a t-error-correcting binary BCH code including means for generating the power sum symmetric functions, $S_1, S_2 ... S_{2t}$, of said code words, a field processor responsive to said power sum symmetric function generating means for generating signals corresponding to the terms of the error-locator polynomial of said code words wherein said field processor comprises

*a.* δ register means for successively generating signals corresponding to the function $$\delta^{(2k+2)} = \delta^{(2k)} + \Delta_1^{(2k)} z\tau^{(2k)},$$

*b.* τ register means responsive to signals from said δ register means for successively generating signals corresponding to the function, $$\tau^{(2k+2)} = \begin{cases} z^2\tau^{(2k)} \text{ if } \Delta_1^{(2k)}=0 \text{ or if } F(k)<0 \\ \dfrac{z\sigma^{(2k)}}{\Delta_1^{(2k)}} \text{ if } \Delta_1^{(2k)}\neq 0 \text{ and if } F(k)\geq 0, \end{cases}$$

*c.* function generating means responsive to signals from said τ register means for successively generating signals corresponding to the function, $$F(k+1) = \begin{cases} F(k)+1 \text{ if } \Delta_1^{(2k)}=0 \text{ or if } F(k)<0 \\ -F(k) \text{ if } \Delta_1^{(2k)}\neq 0 \text{ and } F(k)\geq 0 \end{cases}$$

where $$\delta^{(0)} = 1, \tau^{(0)} = 1 \text{ and } F(0) = 0$$

and where $F(k) = k \triangleq D(2k)$, said function generating means comprising a sequential circuit whose next state outputs for given previous states and present inputs are representative of respective successive values of F(k), said sequential circuit comprising 1. a plurality of shift register stages for storing signals representative of $F(k)$,
2. logic circuit means interconnecting said shift register stages, said logic circuit means including two position switch means, and
3. means responsive to the contents of said shift register stages and to signals representative of $\Delta_1^{(2k)}$ for generating control signals for controlling said switch means to be in a predetermined one of said two positions, said sequential circuit thereby comprising a binary counter when said two-position switch is in one of said two positions and comprising a $\text{mod}_2t$ complementing circuit when in the other of said two positions.

2. A system as in claim 1 further including Chien search means responsive to the signals from said field processor for generating signals corresponding to the roots of said error-locator polynomial and for correcting, at most, $t$ errors in said code words.

3. Apparatus as in claim 2 wherein said field processor further includes means responsive to said Chien search means for signifying that the number of errors in said data stream exceeds the correcting capability, $t$, of said code.

4. Apparatus as in claim 3 wherein said δ register means comprises means for successively registering the values of $\delta^{(2k+2)}$, said $\delta^{(2k+2)}$ registering means including a plurality of stages designated $z, z^2, z^3, \ldots$, for registering the coefficients of $z, z^2, z^3, \ldots$, respectively, of $\delta^{(2k+2)}$.

5. Apparatus as in claim 4 wherein said $\tau$ register means comprises means for registering successive values of $\tau^{(2k+2)}$, said $\tau^{(2k+2)}$ registering means including a plurality of stages designated $z, z^2, z^3, \ldots$, for registering the coefficients of $z, z^2, z^3, \ldots$, respectively, of $\tau^{(2k+2)}$.

* * * * *